(12) United States Patent
Kunii et al.

(10) Patent No.: US 10,933,800 B2
(45) Date of Patent: *Mar. 2, 2021

(54) IMAGE PROJECTION APPARATUS

(71) Applicant: MAXELL, LTD., Kyoto (JP)

(72) Inventors: Yasuhiko Kunii, Kyoto (JP); Toshinori Sugiyama, Kyoto (JP); Takuya Shimizu, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/801,229

(22) Filed: Feb. 26, 2020

(65) Prior Publication Data
US 2020/0189448 A1 Jun. 18, 2020

Related U.S. Application Data

(63) Continuation of application No. 16/529,519, filed on Aug. 1, 2019, now Pat. No. 10,611,296, which is a
(Continued)

(30) Foreign Application Priority Data

Apr. 10, 2015 (JP) .................... 2015-080720

(51) Int. Cl.
*B60Q 1/26* (2006.01)
*G01B 11/30* (2006.01)
(Continued)

(52) U.S. Cl.
CPC ............ *B60Q 1/26* (2013.01); *B60Q 1/0023* (2013.01); *B60Q 1/143* (2013.01); *B60Q 1/50* (2013.01);
(Continued)

(58) Field of Classification Search
CPC ............ B60Q 1/26; B60Q 1/00; G01B 11/30
(Continued)

(56) References Cited

U.S. PATENT DOCUMENTS 7,248,151 B2 * 7/2007 Mc Call .............. B60R 25/2045
340/425.5
9,983,347 B2 5/2018 Fujita
(Continued)

FOREIGN PATENT DOCUMENTS

JP 08-043781 2/1996
JP 2003-231438 A 8/2003
(Continued)

OTHER PUBLICATIONS

International Search Report for WO 2016/163293 A1, dated Jun. 14, 2016.
(Continued)

*Primary Examiner* — Qutbuddin Ghulamali
(74) *Attorney, Agent, or Firm* — Mattingly & Malur, PC

(57) ABSTRACT

An image projection apparatus that can be attached to a vehicle and can be effectively utilized for acquisition of road surface condition information, detection of a hidden vehicle, and the like is provided. The image projection apparatus that projects an image includes: an acquisition unit that acquires information related to a vehicle; an image projection unit that projects an image based on the information acquired by the acquisition unit; and imaging means that acquires an image outside the vehicle, the image projection unit projects light in a wavelength band centered on a wavelength of 1.4 μm and the imaging means provides the information related to the vehicle by imaging an image projected based on the light in the wavelength band centered on the wavelength of 1.4 μm.

10 Claims, 9 Drawing Sheets

Related U.S. Application Data continuation of application No. 16/148,824, filed on Oct. 1, 2018, now Pat. No. 10,434,933, which is a continuation of application No. 15/565,231, filed as application No. PCT/JP2016/060612 on Mar. 31, 2016, now Pat. No. 10,118,537.

(51) Int. Cl.

| | | |
|---|---|---|
| *G03B 21/00* | (2006.01) | |
| *B60Q 1/00* | (2006.01) | |
| *B60Q 1/14* | (2006.01) | |
| *B60Q 1/50* | (2006.01) | |
| *G03B 17/54* | (2021.01) | |
| *G03B 21/26* | (2006.01) | |
| *G03B 29/00* | (2021.01) | |
| *G08G 1/0962* | (2006.01) | |
| *G08G 1/0967* | (2006.01) | |
| *G08G 1/16* | (2006.01) | |
| *H04N 9/31* | (2006.01) | |
| *G01S 17/04* | (2020.01) | |
| *H04N 5/74* | (2006.01) | |
| *B60Q 1/34* | (2006.01) | |
| *G08G 1/005* | (2006.01) | |

(52) U.S. Cl.
CPC .............. *G01B 11/30* (2013.01); *G01S 17/04* (2020.01); *G03B 17/54* (2013.01); *G03B 21/00* (2013.01); *G03B 21/26* (2013.01); *G03B 29/00* (2013.01); *G08G 1/09623* (2013.01); *G08G 1/096716* (2013.01); *G08G 1/096725* (2013.01); *G08G 1/096791* (2013.01); *G08G 1/163* (2013.01); *G08G 1/167* (2013.01); *H04N 5/74* (2013.01); *H04N 9/3185* (2013.01); *H04N 9/3188* (2013.01); *H04N 9/3194* (2013.01); *B60Q 1/34* (2013.01); *B60Q 2300/112* (2013.01); *B60Q 2300/122* (2013.01); *B60Q 2300/142* (2013.01); *B60Q 2300/144* (2013.01); *B60Q 2300/314* (2013.01); *B60Q 2300/32* (2013.01); *B60Q 2300/47* (2013.01); *B60Q 2400/50* (2013.01); *G08G 1/005* (2013.01); *G08G 1/165* (2013.01)

(58) Field of Classification Search
USPC ....................................................... 340/425.5
See application file for complete search history.

(56) References Cited

U.S. PATENT DOCUMENTS

| | | |
|---|---|---|
| 10,043,395 B2 | 8/2018 | Morel et al. |
| 10,118,537 B2 | 11/2018 | Kunii et al. |
| 2009/0097038 A1* | 4/2009 | Higgins-Luthman ....................... B60G 17/019 356/602 |
| 2011/0001639 A1* | 1/2011 | Sasaki ................ G02B 27/0101 340/995.19 |
| 2012/0306635 A1* | 12/2012 | Sato .......................... B60Q 3/12 340/425.5 |
| 2013/0038712 A1* | 2/2013 | Valaix .................... B60K 35/00 348/77 |
| 2013/0127716 A1 | 5/2013 | Nagashima |
| 2013/0286360 A1* | 10/2013 | Kawamura .......... G03B 21/204 353/33 |
| 2013/0307706 A1* | 11/2013 | Kriezman .............. B60Q 1/503 340/988 |
| 2015/0203023 A1* | 7/2015 | Marti ..................... B60Q 1/503 340/425.5 |

FOREIGN PATENT DOCUMENTS

| | | |
|---|---|---|
| JP | 2004-136838 | 5/2004 |
| JP | 2010-026759 | 2/2010 |
| JP | 2012-032465 A | 2/2012 |
| JP | 2012-247369 | 12/2012 |
| JP | 2013-147114 | 8/2013 |
| JP | 2013-213792 | 10/2013 |
| JP | 2014-153868 | 8/2014 |

OTHER PUBLICATIONS

Notice of Reasons for Refusal dated Aug. 25, 2020, received in corresponding Japanese Application No. 2019-141106.

Chinese Office Action received in corresponding Chinese Application No. 201680018867.7 dated Apr. 1, 2020.

* cited by examiner

FIG. 1
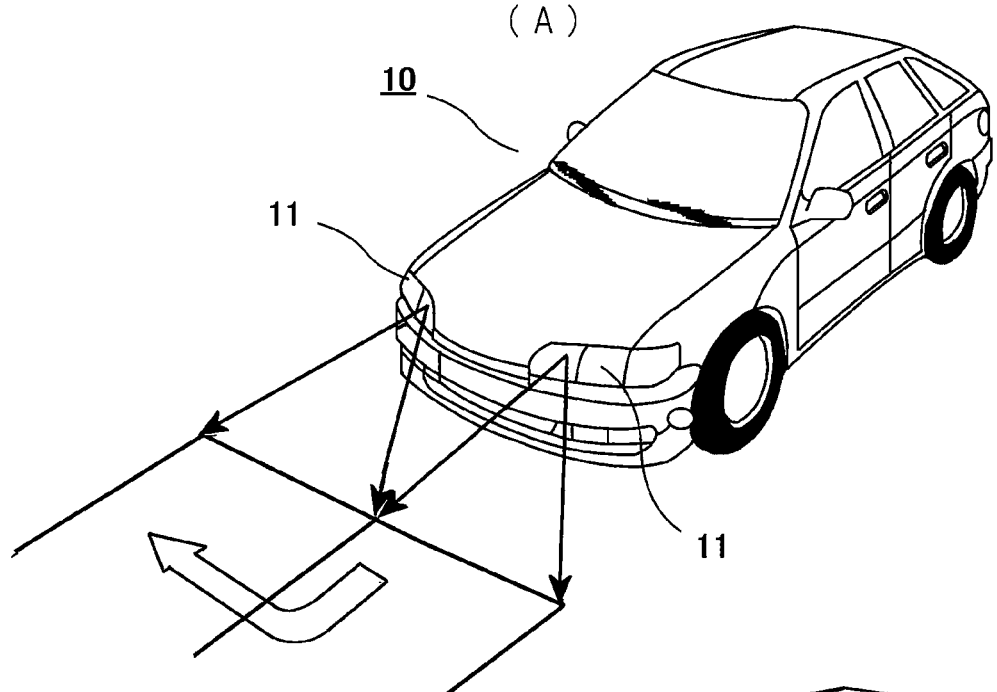
(A)
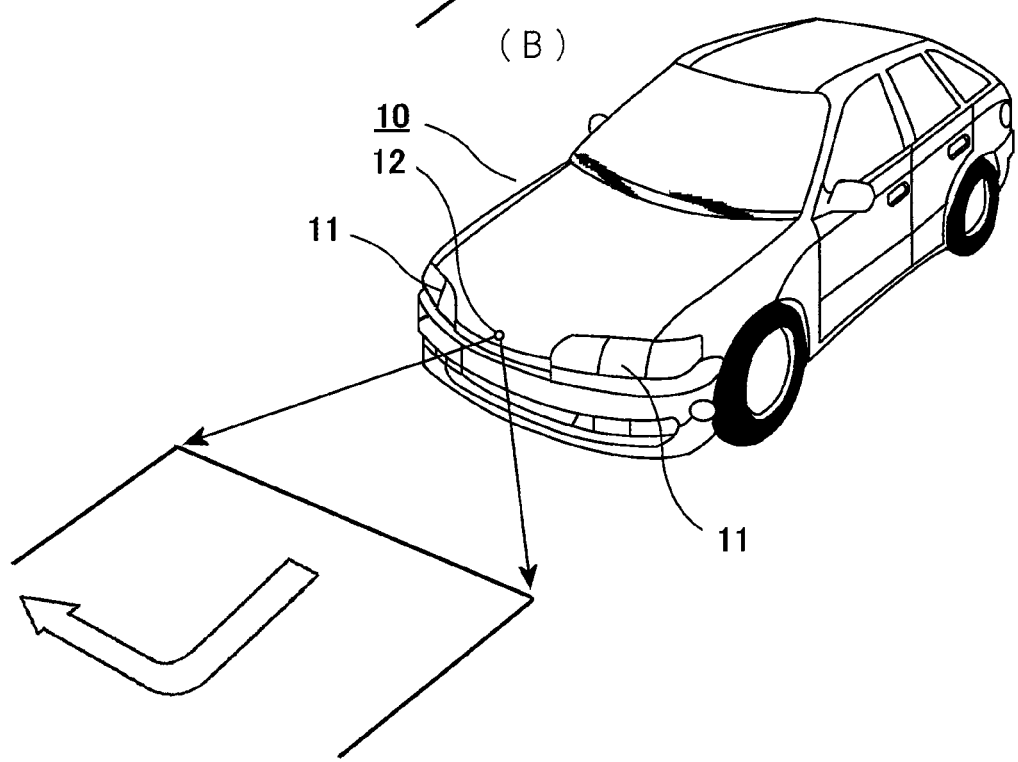
(B)

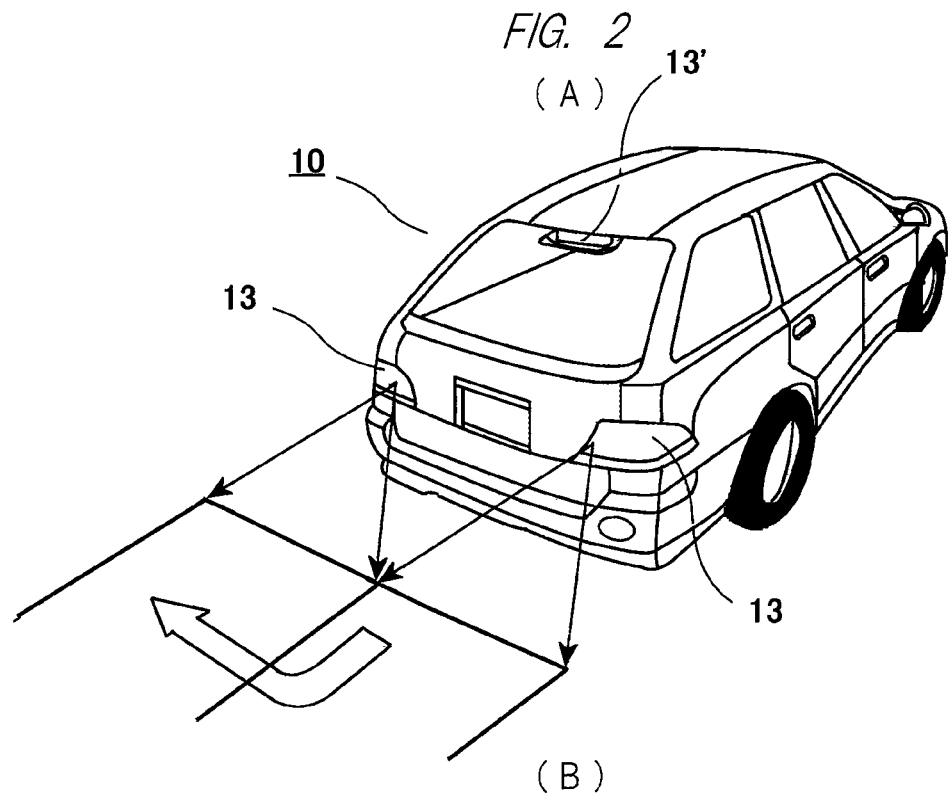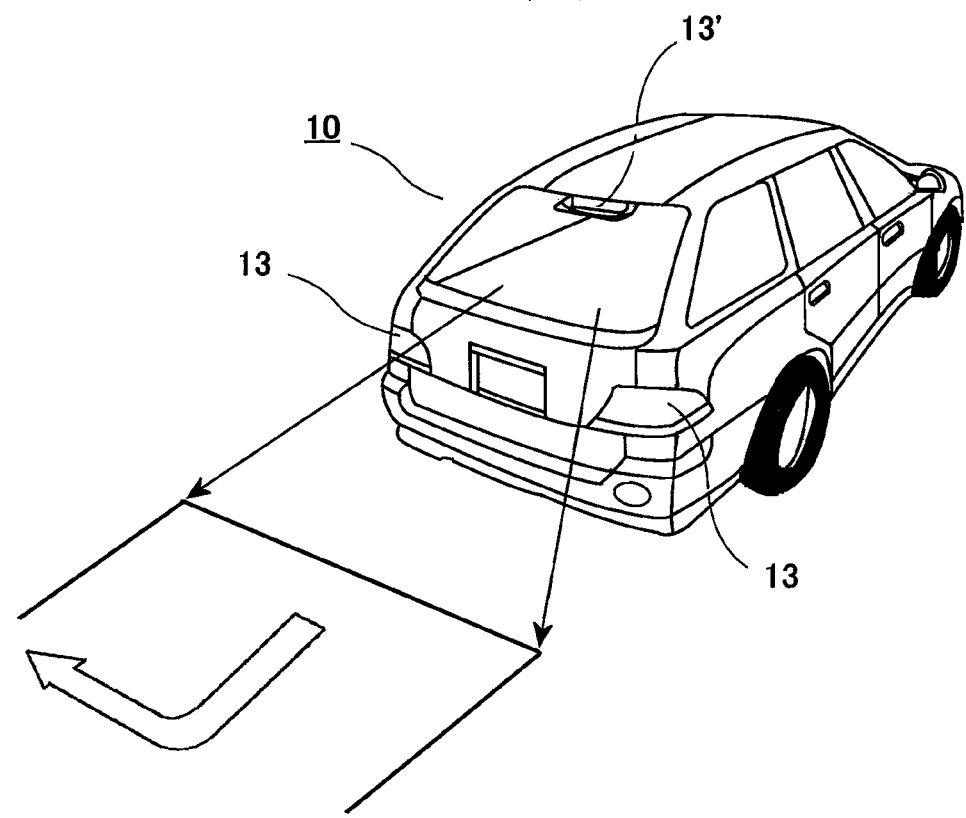

FIG. 8
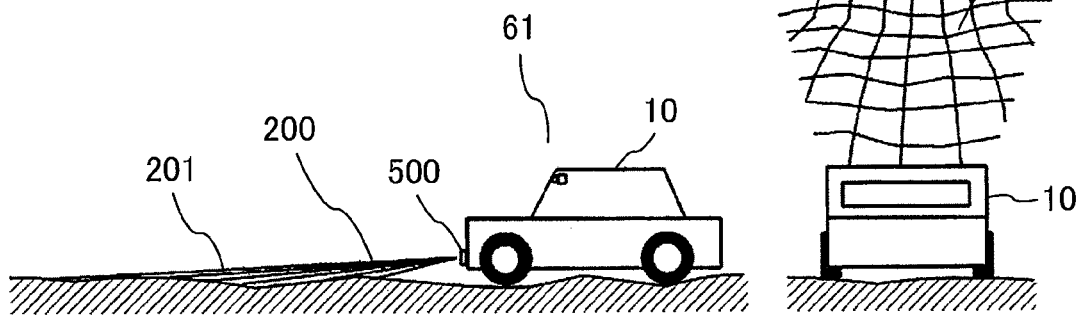
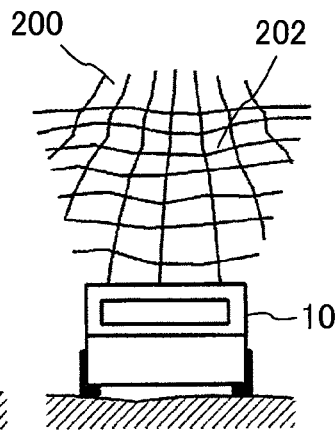
FIG. 9
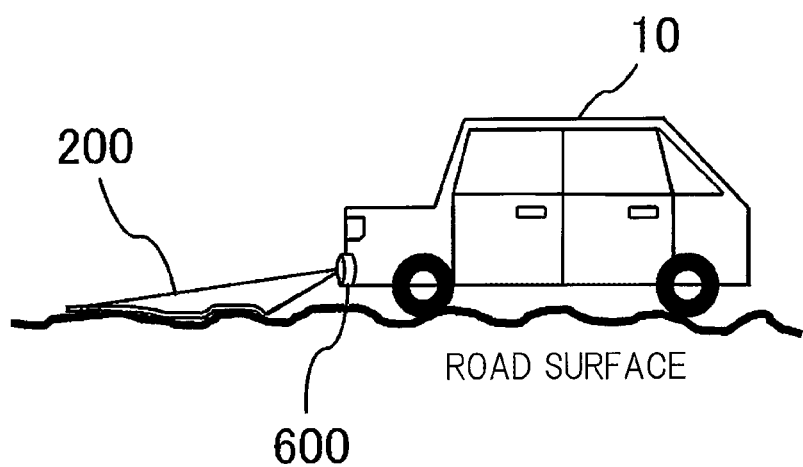

IMAGE PROJECTION APPARATUS

CROSS-REFERENCE TO RELATED PATENT APPLICATIONS

This application is a continuation of U.S. patent application Ser. No. 16/529,519, filed on Aug. 1, 2019, which is a continuation of U.S. patent application Ser. No. 16/148,824 filed on Oct. 1, 2018, now U.S. Pat. No. 10,434,933, which is a continuation of U.S. patent application Ser. No. 15/565,231 filed on Oct. 9, 2017, now U.S. Pat. No. 10,118,537 and claims priority under 35 U.S.C. § 119 of Japanese Patent Application No. 2015-080720, filed on Apr. 10, 2015, and international Patent Application No. PCT/JP2016/060612, filed on Mar. 31, 2016, the entire contents of which are hereby incorporated by reference.

TECHNICAL FIELD

The present invention relates to an image projection apparatus.

BACKGROUND ART

An image projection apparatus typified by a projector has already been used in various fields as an apparatus for projecting a desired image in an enlarged manner, and it has been widely used as a display device for a personal computer and a cellular phone in recent years.

Regarding such an image projection apparatus, those listed below have already been known as prior art techniques particularly related to the use in a vehicle.

RELATED ART DOCUMENTS

Patent Documents

Patent Document 1: Japanese Patent Application Laid-Open Publication No. H08-43781
Patent Document 2: Japanese Patent Application Laid-Open Publication No. 2004-136838
Patent Document 3: Japanese Patent Application Laid-Open Publication No. 2010-26759
Patent Document 4: Japanese Patent Application Laid-Open Publication No. 2012-247369
Patent Document 5: Japanese Patent Application Laid-Open Publication No. 2014-153868
Patent Document 6: Japanese Patent Application Laid-Open Publication No. 2013-213792

SUMMARY OF THE INVENTION

Problems to be Solved by the Invention

Namely, Patent Document 1 described above discloses a projection type display apparatus which uses a vehicle headlight as an external light source by disposing an LCD projector, which incorporates no light source and is excellent in portability, in front of the vehicle headlight. In Patent Document 2, a first state in which the projector is incorporated in front of the headlight in the vehicle in advance and a second state in which the projector or the headlight is moved to emit light flux from the headlight directly to the outside of the vehicle are realized for solving a problem of Patent Document 1, and further an embodiment in which an image is displayed on a road is disclosed.

Also, an apparatus for vehicle driving support which, in order to effectively arouse attention of a driver of a vehicle at the time of determination of lane departure, displays information for promoting attention on a road ahead of a vehicle by irradiation means (laser) attached to a headlight part in front of the vehicle is known by Patent Document 3.

In addition, an apparatus which is provided with a projector as projection means attached at a front part of a vehicle and projects a route guide image for guiding the vehicle in a branching direction based on route information searched by a navigation system on a road surface ahead of the vehicle, with a setting of a projection angle is already known by Patent Document 4. Further, an apparatus for vehicle driving support which enables recognition of a place where a vehicle is heading by projecting a drawing pattern made up of target marks and tracking lines on a road surface ahead of the vehicle based on a traveling state of the vehicle, and thus enables proper driving based thereon is already known by Patent Document 5.

Meanwhile, a technique which provides a camera in a vehicle as photographing means for acquiring an image of a road surface ahead of the vehicle and estimates a condition of the road surface based on the image from the camera is already known by Patent Document 6.

However, in the conventional techniques related to the projector described above, the projector is used only for displaying information such as the traveling state of a vehicle obtained from outside on a road surface, and functions of the projector are not necessarily utilized effectively. Also, in a case where the road surface condition ahead of the vehicle is detected by using Patent Document 6 described above, a necessary road surface image cannot be acquired under sunlight in the daytime in particular due to strong sunlight, and it is difficult to accurately estimate the road surface condition.

Thus, the present invention has been made in view of the problems in the conventional techniques described above, and an object thereof is to provide an image projection apparatus capable of effectively utilizing functions of an image projection unit which is a projector attached to a vehicle (mobile body typified by an automobile or the like).

Means for Solving the Problems

To solve the problems mentioned above, for example, a configuration described in CLAIMS is adopted. The present application includes a plurality of means to solve the problems and an example thereof is an image projection apparatus that projects an image, and the image projection apparatus includes: an acquisition unit that acquires information related to a vehicle; an image projection unit that projects an image based on the information acquired by the acquisition unit; and imaging means that acquires an image outside the vehicle, and further, the image projection unit projects light in a wavelength band centered on a wavelength of 1.4 μm and the imaging means provides the information related to the vehicle by imaging an image projected based on the light in the wavelength band centered on the wavelength of 1.4 μm.

Effects of the Invention

According to the present invention, it is possible to provide an image projection apparatus that can effectively utilize the functions of the image projection unit attached to the vehicle including the acquisition of road surface condition information, the detection of a hidden vehicle, and the like.

BRIEF DESCRIPTIONS OF THE DRAWINGS

FIG. 1 is a front perspective view of a vehicle which mounts an image projection apparatus according to an embodiment of the present invention and projects an image on a road surface or the like;

FIG. 2 is a rear perspective view of a vehicle which mounts the image projection apparatus according to the embodiment of the present invention and projects an image on a road surface or the like;

FIG. 8 is a diagram for describing acquisition of road surface condition information using the projected 1.4 μm wavelength light, in the vehicle which mounts the image projection apparatus according to the present invention;

FIG. 9 is a diagram for describing an example of use of the acquired road surface condition information;

Figure 10:
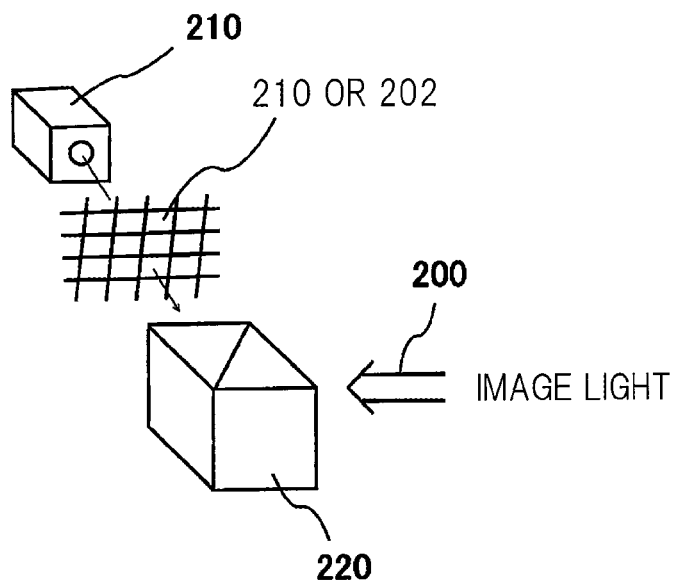
Figure 11:
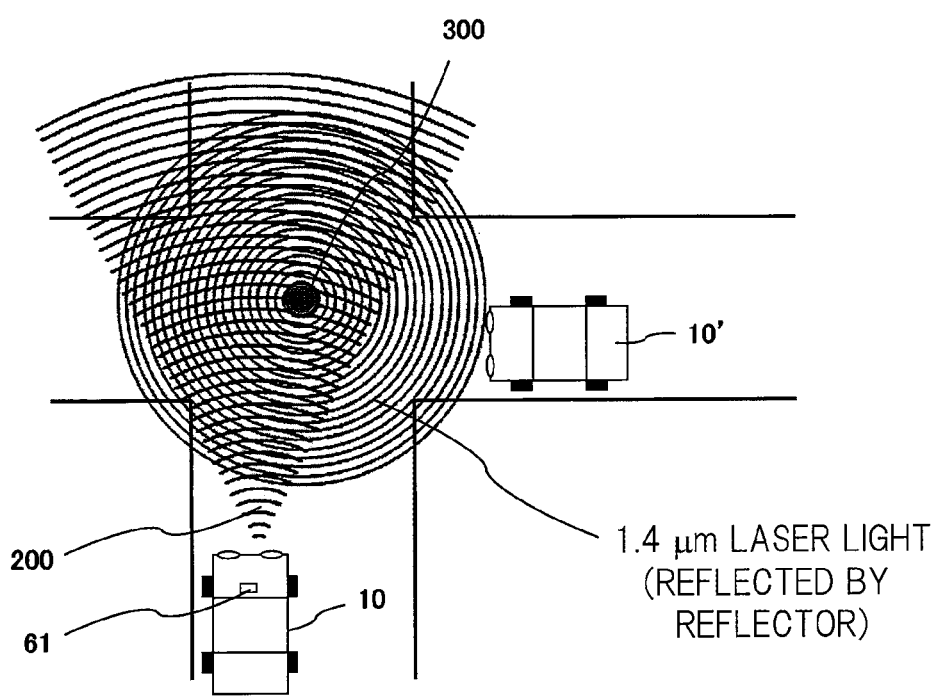

FIG. 10 is a diagram for describing another example of synthesizing the 1.4 μm wavelength light with image light from an image projection apparatus in the image projection apparatus; and FIG. 11 is a diagram for describing detection of a vehicle hidden behind a blind spot using the projected 1.4 μm wavelength light, in the vehicle which mounts the image projection apparatus according to the present invention.

DETAILED DESCRIPTION OF PREFERRED EMBODIMENTS

Hereinafter, embodiments of the present invention will be described in detail with reference to the accompanying drawings.

<Arrangement of Image Projection Apparatus>

First, FIGS. 1(A) and 1(B) illustrate a passenger car as an example of a vehicle 10 which mounts an image projection apparatus according to an embodiment of the present invention, and as illustrated in these figures, a pair of left and right headlights 11 is provided in front of a main body of the vehicle (passenger car) 10. In the example of FIG. 1(A), although not illustrated in detail here, a lamp as a light emitter is incorporated in each of the pair of headlights 11. Also, in the example of FIG. 1(A), a pair of left and right image projection apparatuses described in detail below is mounted in the vehicle (passenger car) 10. Then, image light from the image projection apparatuses is projected ahead of the vehicle (passenger car) through, for example, transparent window parts. In this example, an image projected on a road surface or the like indicates a current or subsequent traveling direction to a pedestrian or the like walking near the vehicle (passenger car), thereby ensuring higher safety.

FIG. 1(B) illustrates an example in which only one image projection apparatus is mounted on a front part of a vehicle body. In this case, image light from the image projection apparatus is projected ahead of the vehicle (passenger car) 10 through, for example, a transparent window part 12 provided on the front part of the vehicle body.

Subsequently, FIGS. 2(A) and 2(B) illustrate a rear side of the passenger car 10 which mounts the image projection apparatus according to the embodiment of the present invention, and as illustrated in these figures, red tail lamps 13 and 13' are provided on the rear side of the vehicle body. Further, in the example of FIG. 2(A), although not illustrated in detail here again, a lamp as a light emitter is incorporated in each of these tail lamps 13 and 13'. Also, in the example of FIG. 2(A), a pair of left and right image projection apparatuses is mounted, and image light from the image projection apparatuses is projected behind the vehicle (passenger car) 10 through, for example, transparent window parts.

FIG. 2(B) illustrates an example in which the image projection apparatus is mounted near the roof of the vehicle body. In the example of FIG. 2(B), similarly to the example of FIG. 1(B), the image light is projected behind the vehicle (passenger car) 10 through a transparent window part provided on a rear end of the vehicle body.

In the foregoing, examples in which one or plural (for example, a pair of) image projection apparatuses are mounted on the front, back, left, and right of the vehicle 10 have been described, but the present invention is not limited to these, and the image projection apparatus may be mounted at any location (for example, a side mirror part, on the roof, side and bottom of the vehicle body) of the vehicle 10. Also, the image projection apparatus may be integrally incorporated in the headlight or the tail lamp. Namely, in the present invention, the image projection apparatus may be mounted at any location as long as a desired image can be projected on the road surface or the like by the image projection apparatus. In a case where the image projection apparatus is integrally incorporated in the headlight or the tail lamp, a light source of the headlight or the tail lamp can be used also as a light source for projection.

<Configuration of Light Control ECU>

Figure 3:
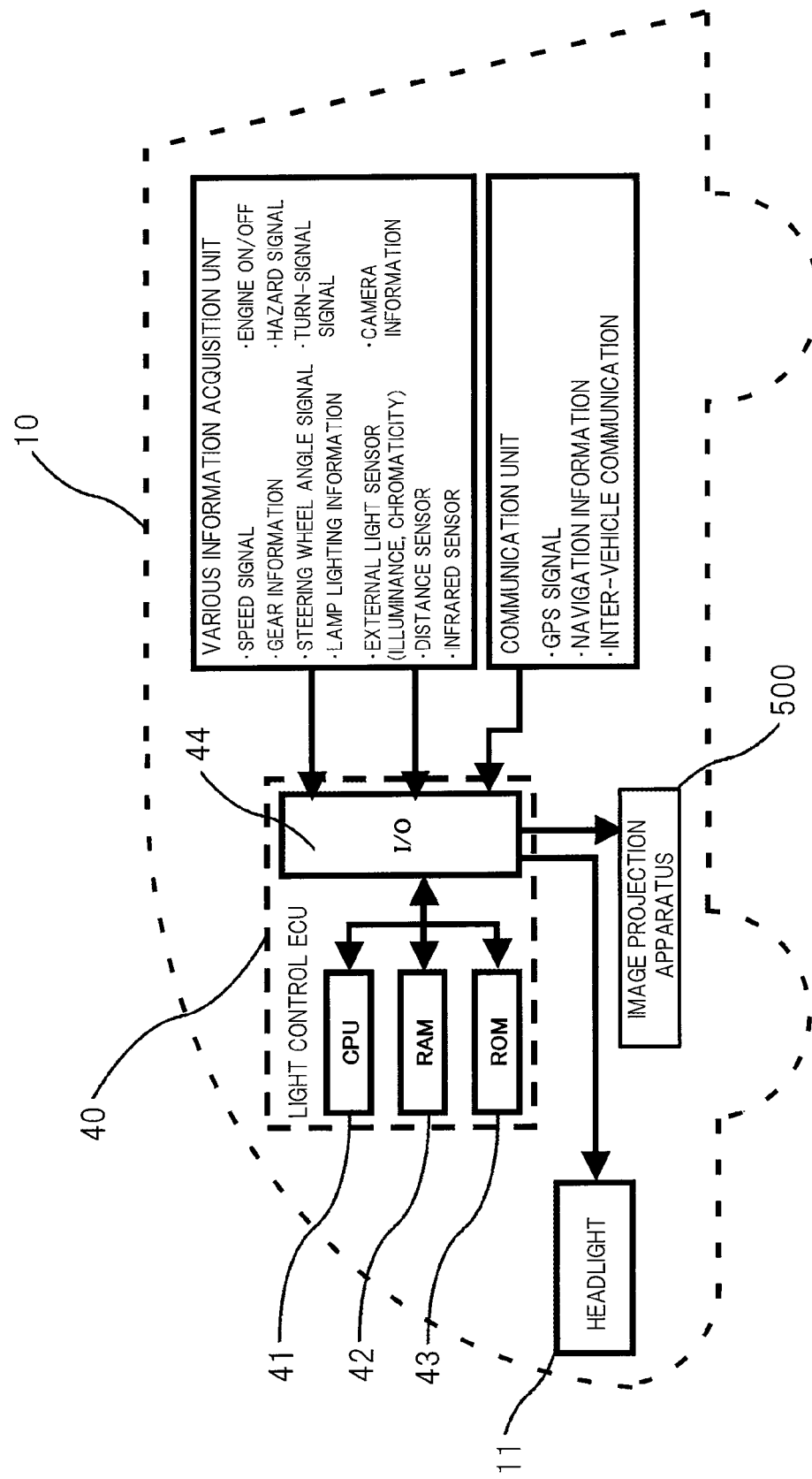
FIG. 3 is a diagram illustrating an overall configuration of a light control ECU constituting the image projection apparatus.

Subsequently, FIG. 3 illustrates an example of a configuration of an electronic control unit (light control ECU) mounted in the passenger car 10 described above. As apparent from the figure, a light control ECU 40 includes a central processing unit (CPU) 41, RAM 42 and ROM 43 as storage means, and an input/output device (I/O unit) 44. The light control ECU receives information input from a various information acquisition unit and a communication unit described below via the I/O unit 44, and controls driving of the headlight 11 and image projection of an image projection apparatus 500.

Note that the information from the various information acquisition unit includes, for example, a speed signal indicating a traveling speed of the vehicle, a signal indicating an engine state (ON/OFF), gear information indicating a gear position, a hazard signal notifying surrounding drivers of existence of danger, a steering wheel angle signal indicating a steering angle of a steering wheel, a turn-signal signal indicating presence/absence of a turn signal (referred to also as a "blinker") and which of the left and right is lighting/blinking, and further lamp lighting information indicating lighting/blinking states of the various lamps.

The information from the various information acquisition unit further includes, for example, information from an external light sensor which detects light outside the vehicle (illuminance signal, chromaticity signal, and the like), image information from a camera attached to the vehicle, a signal from a distance sensor which detects a distance to another vehicle running around the vehicle 10 such as in front of it or other objects, and further a signal from an infrared sensor which detects a situation outside the vehicle in the nighttime.

In addition, the information from the communication unit includes, for example, a GPS (Global Positioning System) signal for determining a position of the vehicle 10, so-called navigation information that is information from a navigation device which performs route guidance and the like, and further information of inter-vehicle communication performed with another vehicle and road-to-vehicle communication performed between the road and the vehicle.

Figure 4:
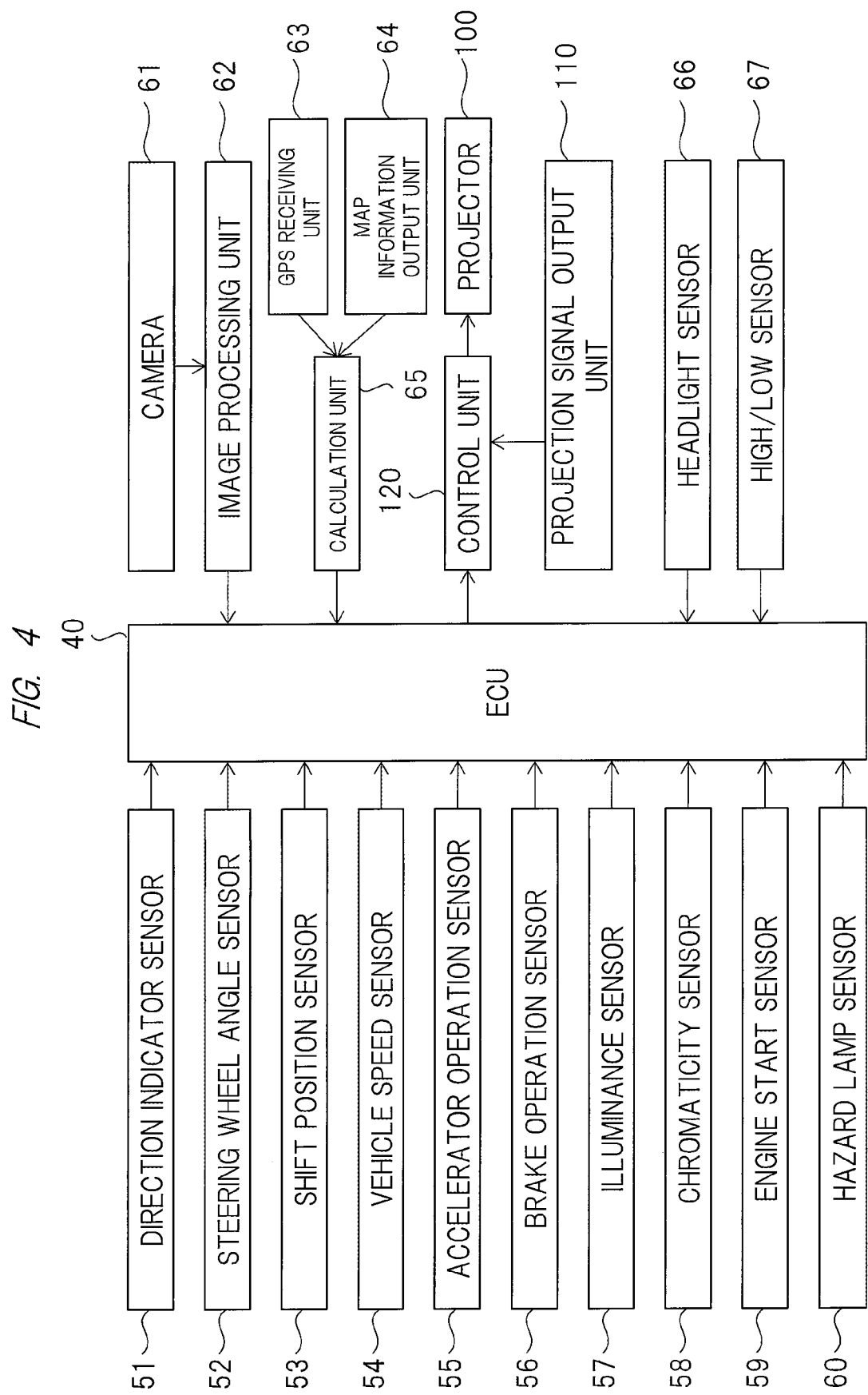
FIG. 4 is a block diagram illustrating a further detailed configuration example of the light control ECU and its peripheral elements.

FIG. 4 illustrates a further detailed configuration of the light control ECU 40 and its peripheral elements described above. Namely, signals from a direction indicator sensor 51, a steering wheel angle sensor 52, a shift position sensor 53, a vehicle speed sensor 54, an accelerator operation sensor 55, a brake operation sensor 56, an illuminance sensor 57, a chromaticity sensor 58, an engine start sensor 59, and a hazard lamp sensor 60 are input to the light control ECU 40. Further, a signal from a camera 61 is input to the ECU 40 via an image processing unit 62, and signals from a GPS receiving unit 63 and a map information output unit 64 are input to the ECU 40 via a calculation unit 65. As will be described in detail later, for example, a signal in a certain wavelength band out of the signal from the camera 61 can be calculated as road surface condition information including unevenness of the road surface on which the vehicle 10 is running by subjecting it to a predetermined processing in the calculation unit 65 or the ECU 40 described above.

Also, a projector 100 constituting the image projection apparatus 500 receives a control signal input from the light control ECU 40 and a signal input from a projection signal output unit 110 (image signal projected on the road surface or the like) via a control unit 120, whereby projection of an image onto the road surface or the like described below is executed.

In addition, the light control ECU 40 further receives signals input from a headlight sensor 66 and a high/low sensor 67.

<Image Projection Apparatus>

Subsequently, an example of a further detailed configuration of the image projection apparatus 500 including the projector 100, the projection signal output unit 110, and the control unit 120 illustrated in FIG. 4 will be described below with reference to FIG. 5.

A projection optical system 501 is an optical system for projecting an image onto the road surface or the like, and includes a lens and/or a mirror. A display device 502 is a device which generates an image by modulating transmitting light or reflecting light, and for example, a transmissive liquid crystal panel, a reflective liquid crystal panel, or a DMD (Digital Micromirror Device) panel (registered trademark) is used. A display device driving unit 503 sends a driving signal to the display device 502, and causes the display device 502 to generate an image. A light source 505 generates light for image projection, and a high pressure mercury lamp, a xenon lamp, an LED light source, a laser light source, or the like is used. A power source 506 supplies power to the light source 505. Further, the power source 506 supplies necessary power to each of other units. An illumination optical system 504 collects and uniformizes the light generated by the light source 505, and emits the light to the display device 502. A cooling unit 515 cools each part to be in a high temperature state such as the light source 505, the power source 506, or the display device 502 by an air cooling method or a liquid cooling method as necessary. An operation input unit 507 is an operation button or a light receiving unit of a remote controller, and receives an operation signal input from a user.

An image signal input unit 531 is connected to an external image output device to receive image data input from the external image output device. An audio signal input unit 533 is connected to an external audio output device to receive audio data input from the external audio output device. An audio output unit 540 is capable of outputting audio based on the audio data input to the audio signal input unit 533. Also, the audio output unit 540 may output an incorporated operation sound or error warning sound. A communication unit 532 is connected to, for example, an external information processing device to input and output various control signals.

A nonvolatile memory 508 stores various data to be used in a projector function. The data stored in the nonvolatile memory 508 includes picture data and image data prepared in advance for the projection onto the road. A memory 509 stores the image data to be projected and control parameters of each unit of the apparatus. A control unit 510 controls operation of each of connected units.

An image adjustment unit 560 performs image processing to the image data input by the image signal input unit 531 and the picture data and the image data stored in the nonvolatile memory 508. The image processing includes, for example, scaling processing that performs enlargement, reduction, and deformation of the image, brightness adjustment processing that changes brightness, contrast adjustment processing that changes a contrast curve of the image, and retinex processing that decomposes the image into light components and changes weighting for each component.

A storage unit 570 records the image, picture, audio, and various data. For example, the image, picture, audio, and various data may be recorded in advance at the time of product shipment, or the image, picture, audio, and various data acquired from an external device, an external server, or the like via the communication unit 532 may be recorded. The image, picture, various data and the like recorded in the storage unit 570 may be output as a projection image via the display device 502 and the projection optical system 501. The audio recorded in the storage unit 570 may be output as audio from the audio output unit 540.

As described above, the image projection apparatus 500 can mount various functions. However, the image projection apparatus 500 does not necessarily have to include all the configurations described above. The image projection apparatus 500 may have any configuration as long as it has a function of projecting the image.

Figure 6:
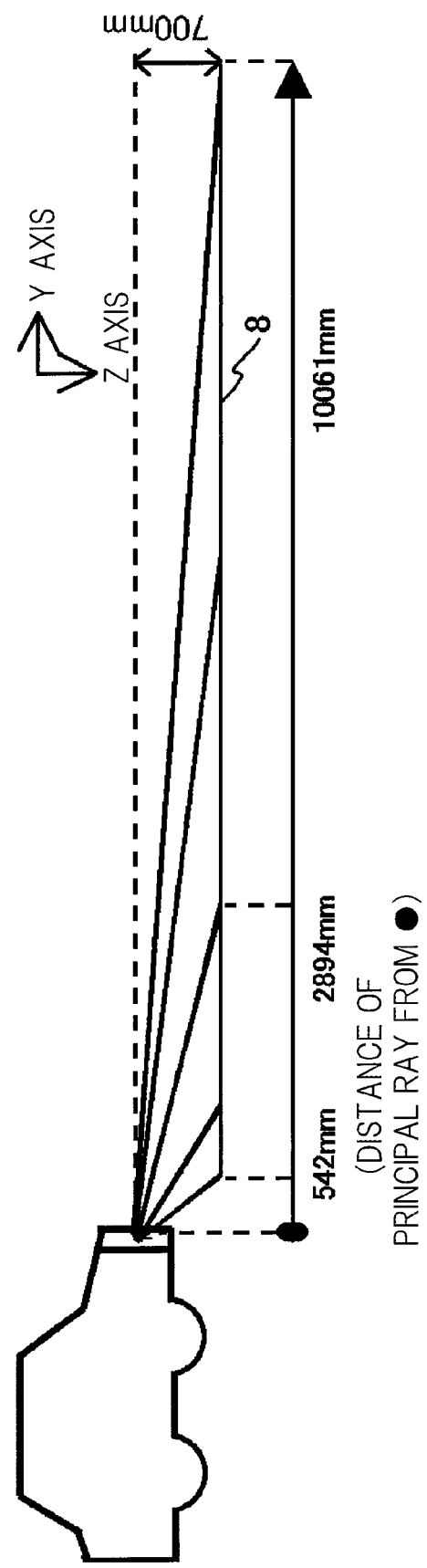
FIG. 6 is a ray diagram including an image plane of a projector.

FIG. 6 is a ray diagram of a projector including an image plane. In this figure, the image light, which is emitted from the light source constituted of an LED or the like (not illustrated) and transmits through the image display device, passes through a filter and the like, is refracted by various lens systems, and is further reflected in accordance with the configuration, and is then projected on an image plane 8 (road surface or the like).

In this manner, in the image projection apparatus 500 described above, the length of the long side of the range of the projection image is 10061−542≈9519 9520 mm with respect to the projection distance of 700 mm, and thus an unprecedented wide angle of view with the projection ratio of 700/9520=0.07 is realized.

In the foregoing, one image projection apparatus 500 and the projection optical system thereof have been described, but as described above, one or plural (for example, a pair of)

projectors may be mounted on the vehicle (or integrally incorporated in the headlights or tail lamps) in the present invention so that a desired image is projected on the road surface or the like. At that time, in a case of the plural (for example, the pair of) image projection apparatuses 500 as illustrated in FIG. 1(A) and FIG. 2(A) in particular, the same image may be projected on the road surface or the like from each of the image projection apparatuses 500 (in this case, the same image is displayed on the display device 502 of FIG. 5), or different images may be projected from the left and right image projection apparatuses 500 and synthesized together on the road surface or the like (in this case, an image obtained by dividing the desired image into left and right is displayed on the display device 502 of FIG. 5).

In the foregoing, as the image projection apparatus 500 that projects the image on the road surface or the like, the configuration using the transmissive liquid crystal image display device has been described, but the present invention is not limited thereto. For example, a reflective image projection apparatus 500 constituted of a micromirror such as a DLP (Digital Light Processing) apparatus and an image projection apparatus 500 capable of projecting image light from a light modulable planar light emitting diode via the projection optical system can also be used as the image projection apparatus 500 in addition to that described above. Namely, in the present invention, any image projection apparatus 500 may be used as long as the desired image can be projected on the road surface or the like by the image projection apparatus 500.

Note that, in the present invention, the image projection apparatus 500 described in detail above is used not only for displaying information such as a traveling state of the vehicle 10 obtained from various sensors and devices on the road surface like in the conventional technique, but also for making it possible to accurately obtain road surface condition information that is a condition including unevenness of the road surface in the traveling direction of the vehicle 10, and further to detect another vehicle existing near the vehicle 10 but hidden behind a blind spot.

<Acquisition of Road Surface Condition Information>

In the following, a configuration for accurately obtaining road surface condition information and its function of the image projection apparatus 500 will be described, but prior to that, its principle will be described first.

Figure 7:
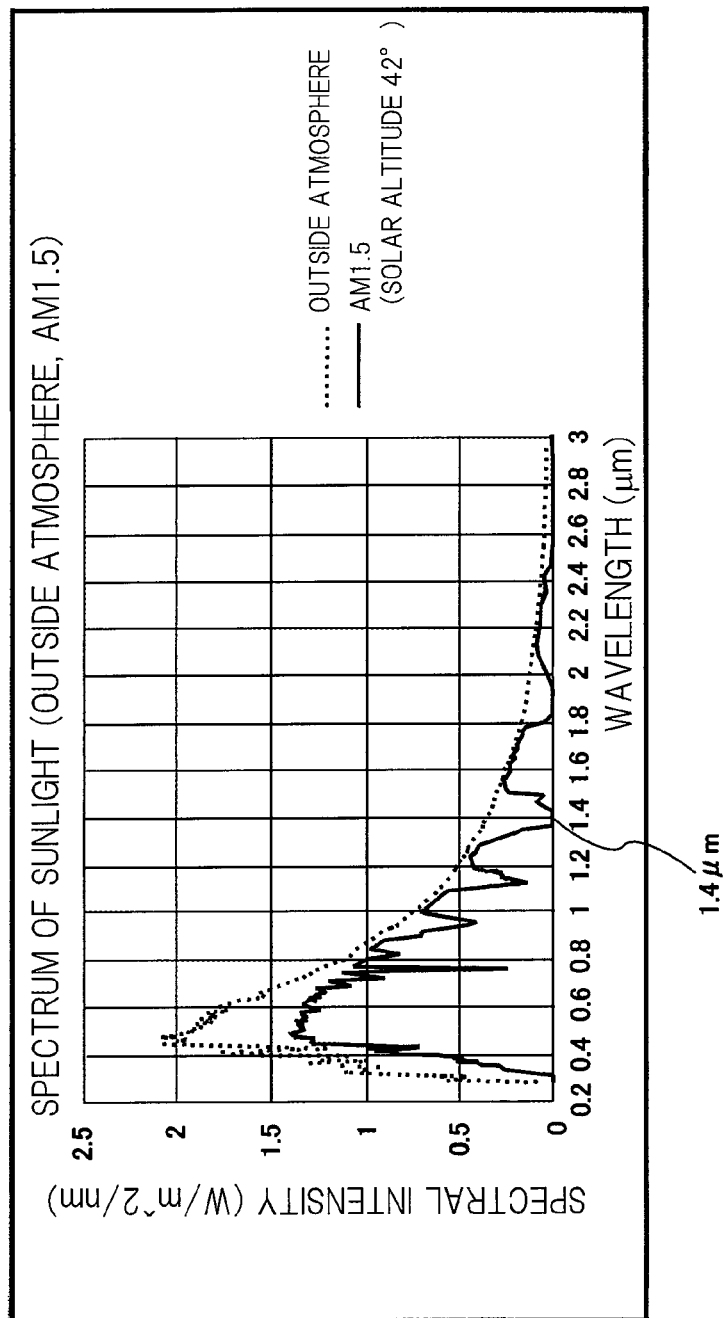
FIG. 7 is a diagram for describing spectral intensity of sunlight and 1.4 μm wavelength light of AM1.5 used in the present invention.

FIG. 7 is a graph of spectral intensity of sunlight, and illustrates spectral intensity outside the atmosphere by a broken line and spectral intensity (solar altitude 42°) in the atmosphere by a solid line. As apparent from the graph, since some of the wavelength components of sunlight outside the atmosphere indicated by the broken line are absorbed by the ozone layer and the H2O component in the atmosphere, some of the spectral components thereof are reduced or eliminated in the spectral intensity on the ground referred to as "AM1.5" indicated by the solid line. In particular, the intensity is substantially zero (0) in the wavelength band centered on a wavelength of 1.4 μm in the near infrared region. Namely, on the ground where the vehicle 10 runs, the sunlight does not contain a component of the wavelength of 1.4 μm.

Thus, various studies by the inventors of the present application have found that, if the light in the wavelength band centered on the wavelength of 1.4 μm (hereinafter, simply referred to also as "1.4 μm wavelength light") is used, it is possible to avoid the influence by the sunlight. Therefore, in the present invention, based on the findings by the inventors of the present application described above, a technique capable of stably obtaining road surface condition information without being affected by the sunlight by using near infrared light in the wavelength band centered on the wavelength of 1.4 μm is proposed.

Specifically, as illustrated also in FIG. 8(A), a traveling state of the vehicle and other various types of information are displayed on the road surface and image light 200 containing 1.4 μm wavelength light 201 described above is projected on the road surface by the image projection apparatus 500 attached in front of the vehicle 10. In that case, for example, it is preferable to project a light image (hereinafter, referred to also as "sensing projection image") 202 in which the 1.4 μm wavelength light is formed into a lattice (mesh) shape made up of multiple rectangles.

Meanwhile, the camera 61 attached to the vehicle 10 receives light including reflected light of the 1.4 μm wavelength light 201 on the road surface, and generates an image signal including a traveling road surface. At this time, if image processing based on the 1.4 μm wavelength light is performed in the calculation unit 65 or the ECU 40, it is possible to accurately obtain the road surface condition information that is the condition including unevenness of the road surface in the traveling direction of the vehicle 10, without being affected by the sunlight.

At this time, if the image light 200 containing the "sensing projection image" 202 described above is projected, it becomes possible to easily estimate the unevenness on the road surface by capturing the light image in a lattice (mesh) shape deformed depending on the shape on the road surface including the unevenness by the camera 61 as illustrated in FIG. 8(B). Note that the light image in the lattice shape to be projected is made to be an image whose lattice spacing becomes wider as the image is farther from the vehicle 10, whereby decrease in resolution of an imaging device due to oblique imaging can be prevented.

Regarding the road surface condition information acquired as described above, an image for giving warning of the presence of unevenness on the road surface may be displayed by the image projection apparatus 500, or the warning may be transmitted to a driver by audio through a speaker in the vehicle. Alternatively, the road surface condition information can be used for controlling the brake and active suspension of the vehicle 10 via the ECU 40 illustrated in FIG. 4. Further, the road surface condition information can be transmitted to another vehicle by an inter-vehicle communication function of the communication unit illustrated in FIG. 3.

In particular, in a case where the image projection apparatus 500 projects the image indicating various types of information on the road surface, an image compensated with the condition of the road surface that is a projection plane of the image can be displayed by using the road surface condition information as illustrated in FIG. 9, so that satisfactory display without depending on the condition of the road surface is possible.

Figure 5:
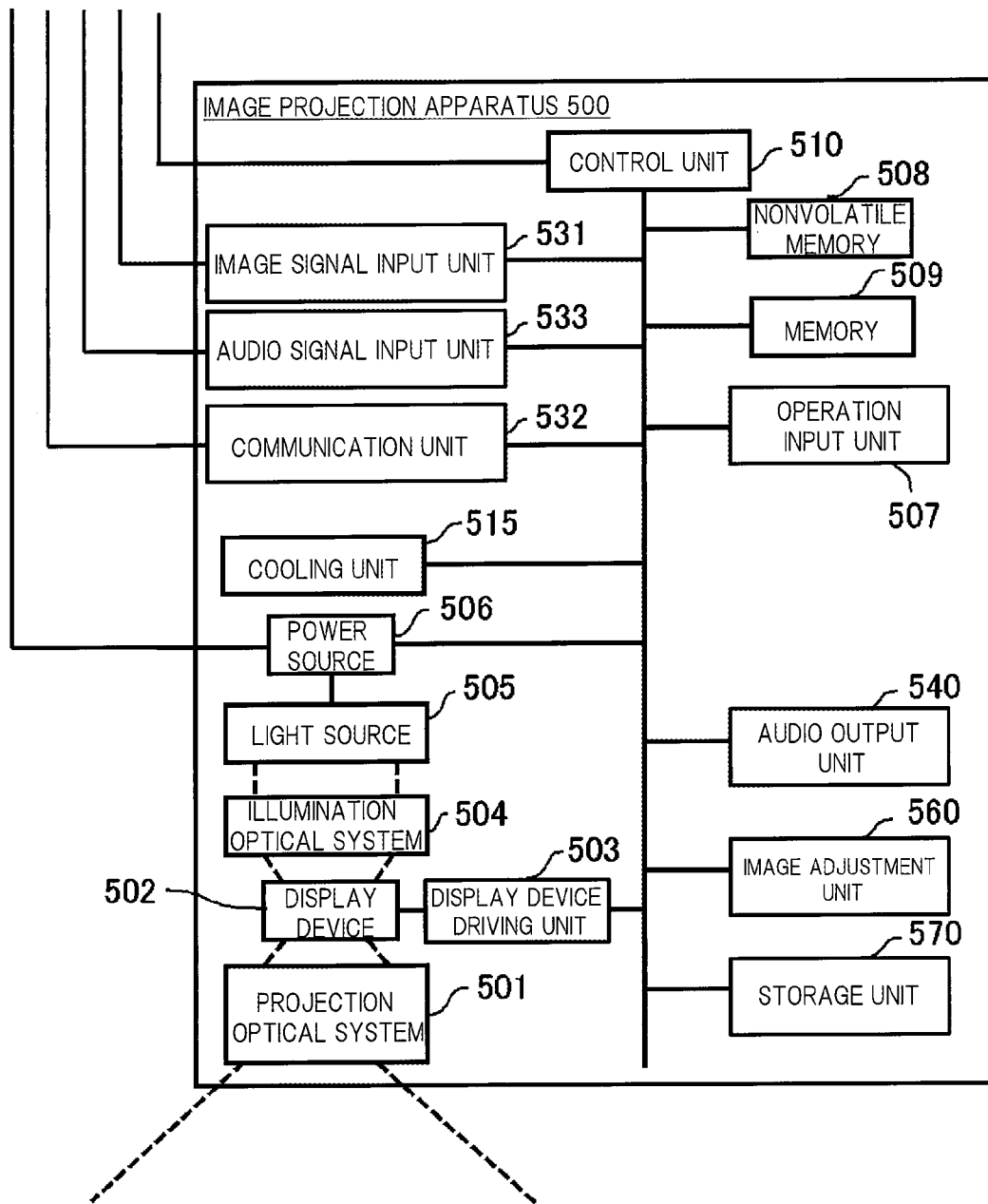
FIG. 5 is a diagram illustrating an example of a configuration of the image projection apparatus according to the embodiment of the present invention.

Here, in the case of projecting the 1.4 μm wavelength light described above, if the light source (see reference 505 of FIG. 5) has a configuration capable of emitting light containing a near infrared ray of 1.4 μm (including an infrared laser, for example) in the image projection apparatus 500 illustrated in FIG. 5, it is sufficient if a filter that can transmit the 1.4 μm wavelength light when light from the light source is modulated into projection light by a liquid crystal panel or the like (see the display device 502) is inserted on the liquid crystal panel. Also, in the case of projecting the "sensing projection image", it is sufficient if an image in a lattice (mesh) shape is synthesized with the 1.4 μm wavelength light and displayed on the liquid crystal panel. In the case where the image in the lattice shape is displayed on the liquid crystal panel with the 1.4 µm wavelength light and is then projected, it is preferable that the image is displayed intermittently in a short period of time that cannot be sensed by human vision, for example, in consideration of a possibility of an adverse effect on another image (driving information of the vehicle and the like) projected simultaneously or sequentially.

Alternatively, it is apparent to those skilled in the art that it is also possible to separately generate the 1.4 µm wavelength light 201 or the sensing projection image 202 described above by a light source 210 such as a semiconductor infrared laser in place of the above, and synthesize the light with the image light 200 projected from the image projection apparatus 500 by synthesizing means 220 such as a photosynthetic prism as illustrated in FIG. 10. Also in that case, in the case of generating the 1.4 µm wavelength light in particular, it is preferable that the image is displayed intermittently in a short period of time that cannot be sensed by human vision, for example, in consideration of an adverse effect on another image (driving information of the vehicle and the like) to be projected.

<Detection of Vehicle Hidden Behind Blind Spot>

Subsequently, an example in which the image projection apparatus 500 is configured to detect another vehicle existing near the vehicle 10 but hidden behind a blind spot will be described below.

FIG. 11 illustrates an example in which the vehicle 10 and another vehicle 10' stop at an intersection, and a reflector 300 made of disk-shaped metal is installed and embedded in the road surface at the center of the intersection in this example. Here, the other vehicle 10' is hidden by a building around the intersection, that is, the vehicle 10' stops at a position that is a blind spot of the vehicle 10.

Here, if the image light containing the 1.4 µm wavelength light 200 described above is projected ahead of the vehicle 10 by the image projection apparatus 500, the 1.4 µm wavelength light 200 spreads in a fan shape, and strikes the reflector 300 at the center of the intersection. Thus, the 1.4 µm wavelength light 200 is reflected on the reflector 300, and propagates around the reflector 300. Thereafter, the 1.4 µm wavelength light 200 reaches the other vehicle 10' stopping at the blind spot and is reflected thereon, and propagates again along the route described above to return to the vehicle 10.

Then, if the reflected light of the 1.4 µm wavelength light 200 is detected by detection means such as the camera 61 described above (see FIG. 4), it is possible to detect the other vehicle 10' hidden behind the blind spot. Note that an example in which the reflector 300 of the 1.4 µm wavelength light 200 is installed at the center of the intersection has been described above, but the reflector 300 may have a shape other than the disk-shape, and may be installed at the corner of the intersection regarding the location thereof. Also, projection of the 1.4 µm wavelength light is preferably displayed intermittently in a short period of time as described above.

In the foregoing, an example in which the image projection apparatus 500 that generates the 1.4 µm wavelength light is installed in front of the vehicle 10 corresponding to the traveling direction thereof has been described in detail, but the present invention is not limited thereto, and the image projection apparatus 500 may be provided on the rear side of the vehicle 10.

Note that various embodiments of the present invention have been described above, but the present invention is not limited to the embodiments described above, and includes various modification examples. For example, the above embodiments have described the entire system in detail in order to make the present invention easily understood, and the present invention is not necessarily limited to those having all the described configurations. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

In addition, regarding the configurations, functions, processing units, processing means, and the like described above, some or all of them may be realized by hardware designed with integrated circuits. Also, the configurations, functions, and the like described above may be realized by software by interpreting and executing a program for realizing each function by a processor. Information such as a program, a table, a file, and the like for realizing each function can be stored in a recording device such as a memory, a hard disk, or an SSD (Solid State Drive) or a recording medium such as an IC card, an SD card, or a DVD.

REFERENCE SIGNS LIST 10 vehicle (passenger car)
11 headlight
12 window part
13, 13' tail lamp
40 light control ECU
61 camera
62 image processing unit
500 image projection apparatus
501 projection optical system
502 display device
503 display device driving unit
504 illumination optical system
505 light source
531 image signal input unit
533 audio signal input unit
532 communication unit

The invention claimed is:

1. A system for being mounted on a vehicle, having an image projection system for projecting an image on a road surface, comprising:
an image projection system comprises a plurality of projectors including an information image projector and a sensing light projector;
a camera configured to image an outside of the vehicle, and
a controller configured to control the image projection system and the camera,
wherein the information image projector is configured to comprise:
a light source configured to irradiate light;
a light modulator configured to modulate the light from the light source based on the information related to a vehicle input by the controller and generate an information image; and
a projection optical system configured to project the information image generated by the light modulator on a road surface;
wherein the sensing light projector is configured to project a predetermined wavelength light for sensing on the road surface, wherein the camera is further configured to image the road surface by using the predetermined wavelength light projected on the road surface, and wherein the light for the information image and the predetermined wavelength light for sensing are both projected via a common light-synthesizing optical element.

2. The system according to claim 1,
wherein the predetermined wavelength light for sensing is light of a wavelength of 1.4 µm.

3. The system according to claim 1,
wherein the light modulator is a transmissive liquid crystal panel, reflective liquid crystal panel, or a digital micromirror device.

4. The system according to claim 1,
wherein the light source is a high pressure mercury lamp, a xenon lamp, a LED light source, or a laser light source.

5. The system according to claim 1,
wherein the controller is further configured to control the information image to compensate for the road surface condition.

6. The system according to claim 1, wherein
the controller is further configured to input a signal including information related to a steering wheel angle of the vehicle and to control the information image projector to change the information image based on the information related to the steering wheel angle of the vehicle.

7. The system according to claim 1, wherein,
the plurality of projectors are configured to comprise:
a first projector mounted on a front right side of the vehicle; and
a second projector mounted on a front left side of the vehicle.

8. The system according to claim 7, wherein,
the first projector is arranged near a right side headlight of the vehicle; and
the second projector is arranged near a left side headlight of the vehicle.

9. The system according to claim 1, wherein,
the plurality of projectors is configured to comprises a projector configured to project an information image backward from the vehicle.

10. The system according to claim 1, wherein,
the information image projector is further configured to project the information image forward from the vehicle.

* * * * *